US012614792B2

(12) United States Patent
    Li

(10) Patent No.:    US 12,614,792 B2
(45) Date of Patent:      Apr. 28, 2026

(54) METHOD FOR MANUFACTURING AN ALUMINUM CASE OF A BATTERY

(71) Applicant: SHENZHEN KEDALI INDUSTRY CO., LTD., Longhua District Shenzhen (CN)

(72) Inventor: Jianju Li, Longhua District Shenzhen (CN)

(73) Assignee: SHENZHEN KEDALI INDUSTRY CO., LTD., Guangdong (CN)

( * ) Notice: Subject to any disclaimer, the term of this patent is extended or adjusted under 35 U.S.C. 154(b) by 769 days.

(21) Appl. No.: 17/843,458

(22) Filed: Jun. 17, 2022

(65) Prior Publication Data

US 2022/0314296 A1     Oct. 6, 2022

Related U.S. Application Data

(63) Continuation-in-part of application No. 16/644,096, filed as application No. PCT/CN2018/081033 on Mar. 29, 2018, now abandoned.

(30) Foreign Application Priority Data

| Nov. 17, 2017 | (CN) | ......................... | 201721541853.1 |
| Nov. 17, 2017 | (CN) | ......................... | 201721541854.6 |
| Nov. 17, 2017 | (CN) | ......................... | 201721543559.4 |

(51) Int. Cl.
    *H01M 50/183*     (2021.01)
    *H01M 50/103*     (2021.01)
    (Continued)

(52) U.S. Cl.
    CPC ....... *H01M 50/183* (2021.01); *H01M 50/103* (2021.01); *H01M 50/119* (2021.01);
    (Continued)

(58) Field of Classification Search
    CPC ............ H01M 50/119; H01M 50/124; H01M 50/1243; H01M 50/1245; H01M 50/126; H01M 50/128; H01M 50/129
    See application file for complete search history.

(56) References Cited

U.S. PATENT DOCUMENTS

| 2006/0025555 A1* | 2/2006 | Ichihashi | ........... | C08G 18/4277 |
| | | | | 528/44 |
| 2008/0286635 A1* | 11/2008 | Seino | ........................ | B32B 7/12 |
| | | | | 428/354 |

(Continued)

FOREIGN PATENT DOCUMENTS

| KR | 101375239 B1 * | 3/2014 | ............. | B32B 27/08 |

*Primary Examiner* — Imran Akram
(74) *Attorney, Agent, or Firm* — Wood, Phillips, Katz, Clark & Mortimer

(57) ABSTRACT

A method for manufacturing an aluminum case of a battery includes: attaching an insulating layer to at least one surface of the plate body with an adhesive layer, wherein the adhesive layer is disposed between the insulating layer and the plate body; stamping, before the adhesive layer is cured, the plate body coated with the insulating layer to form the aluminum case in a predetermined shape, wherein during the stamping of the plate body, the insulating layer is movable relative to the plate body since the adhesive layer is not cured; and curing the adhesive layer after the stamping of the plate body is completed so that the insulating layer is fixed to the plate body, thereby avoiding detachment of the insulating layer and the plate body on the aluminum case.

8 Claims, 3 Drawing Sheets

Attach an insulating layer to at least one surface of the plate body with an adhesive layer, where the adhesive layer is disposed between the insulating layer and the plate body    S1

Stamp, before the adhesive layer is cured, the plate body coated with the insulating layer to form the aluminum case in a predetermined shape, where during the stamping of the plate body, the insulating layer is movable relative to the plate body since the adhesive layer is not cured    S2

Cure the adhesive layer after the stamping of the plate body is completed so that the insulating layer is fixed to the plate body, thereby avoiding detachment of the insulating layer and the plate body on the aluminum case    S3

(51) Int. Cl.
    *H01M 50/119*       (2021.01)
    *H01M 50/124*       (2021.01)
    *H01M 50/126*       (2021.01)
    *H01M 50/171*       (2021.01)

(52) U.S. Cl.
    CPC ....... *H01M 50/126* (2021.01); *H01M 50/171* (2021.01); *H01M 50/1243* (2021.01)

(56) References Cited

U.S. PATENT DOCUMENTS

| | | | |
|---|---|---|---|
| 2011/0045327 A1* | 2/2011 | Yawata ................. | H01M 50/24 |
| | | | 429/82 |
| 2011/0212360 A1* | 9/2011 | Myerberg ......... | H01M 10/0587 |
| | | | 429/174 |
| 2013/0171491 A1* | 7/2013 | Wei ................... | H01M 10/6555 |
| | | | 165/47 |
| 2014/0152264 A1* | 6/2014 | Schaefer .............. | H01M 10/02 |
| | | | 429/178 |
| 2016/0301040 A1* | 10/2016 | Takahagi ............. | H01M 50/119 |
| 2017/0309953 A1* | 10/2017 | Harayama ......... | H01M 10/0525 |

* cited by examiner

METHOD FOR MANUFACTURING AN ALUMINUM CASE OF A BATTERY

CROSS-REFERENCES TO RELATED APPLICATIONS

This application is a continuation-in-part of U.S. patent application Ser. No. 16/644,096 filed Mar. 3, 2020, disclosure of which is incorporated herein by reference in its entirety.

TECHNICAL FIELD

The present disclosure relates to the technical field of batteries, for example, an aluminum case.

BACKGROUND

In a power battery, an aluminum case is generally used as a load-bearing component of an outer case structure, and a cover plate is used as a closing component of the outer case structure, where the aluminum case is a box-like structure with an opening, and the cover plate is closed at the opening of the aluminum case to form the outer case of the battery. The aluminum case may be directly stretch-molded by an aluminum plate. After the battery is formed, the aluminum case, the cover plate and a positive cell are all connected and are positively charged. In order to avoid short circuit inside the battery during use, a negative cell will be externally covered with an insulating film to avoid contact short circuit between the negative cell and an inner surface of the aluminum case. However, with the use of batteries, especially for batteries equipped on mobile carriers such as power batteries, such as power batteries, the negative cell may constantly rub against the inner surface of the aluminum case, and if the insulating film covering the negative cell is damaged, a short circuit may occur, resulting in scrap of the battery and even other accidents. In addition, metal dust formed on the inner surface of the aluminum case during a processing of the aluminum plate may also easily cause the short circuit inside the battery and cause a security accident.

SUMMARY

The present disclosure provides an aluminum case. At least one of an inner surface and an outer surface of the aluminum case after being molded has an insulating layer, reducing metal dust, improving the safety of the battery, and reducing the subsequent production cost of the battery.

Provided is a method for manufacturing an aluminum case of a battery. The battery comprises a cover plate, the cover plate is closed at an opening of the aluminum case to form an outer case of the battery, and the aluminum case comprises a plate body. The method includes: attaching an insulating layer to at least one surface of the plate body with an adhesive layer, wherein the adhesive layer is disposed between the insulating layer and the plate body; stamping, before the adhesive layer is cured, the plate body coated with the insulating layer to form the aluminum case in a predetermined shape, wherein during the stamping of the plate body, the insulating layer is movable relative to the plate body since the adhesive layer is not cured; and curing the adhesive layer after the stamping of the plate body is completed so that the insulating layer is fixed to the plate body, thereby avoiding detachment of the insulating layer and the plate body on the aluminum case.

Figure 1:
FIG. 1 is a schematic structural diagram of an aluminum plate provided by an embodiment.

Where:

1—aluminum plate, 11—plate body, 12—insulating layer.

DETAILED DESCRIPTION

The technical solutions of the present disclosure are described hereinafter through specific embodiments in conjunction with the accompanying drawings.

In the description of the present embodiment, it is to be understood that the orientation or position relationships indicated by terms such as "above", "below", "front", "back", "left", "right", "vertical", "horizontal", "top", "bottom", "inside", "outside" are based on the orientation or position relationships shown in the drawings, merely for facilitating description of the present embodiment, and these relationships do not indicate or imply that the referred device or element must have a specific orientation and is constructed and operated in a specific orientation, and thus it is not to be construed as limiting the present embodiment.

Figure 2:
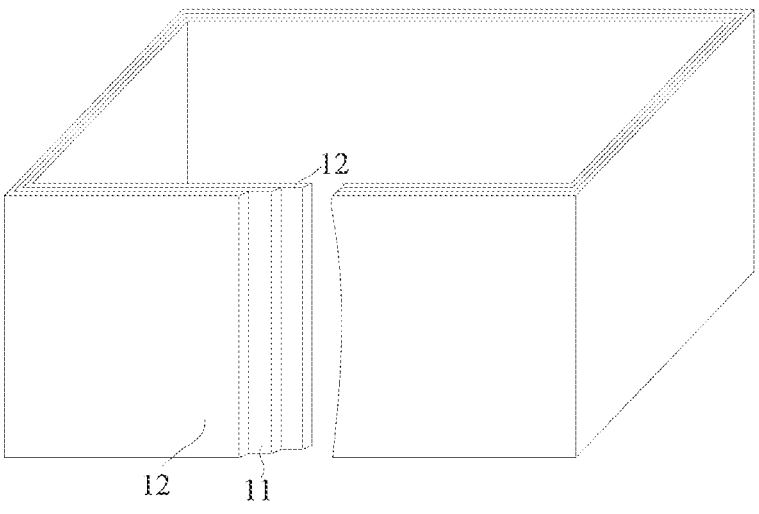
FIG. 2 is a schematic structural diagram of an aluminum case provided by an embodiment.

As shown in FIG. 2, the present embodiment provides an aluminum case with an insulating layer on a surface of the aluminum case. After the aluminum case is molded, an inner surface and an outer surface are both provided with an insulating layer 12. The aluminum case is made of an aluminum plate 1 as shown in FIG. 1. The aluminum plate 1 includes a plate body 11, and both surfaces of the plate body 11 are respectively attached with the insulating layer 12, so that the inner surface and the outer surface of the molded aluminum case are both provided with the insulating layer 12. In one embodiment, the aluminum case may be stamp-molded from the aluminum plate 1, for example, molded by stamp-stretching, which is convenient for manufacturing. A thickness of the insulating layer 12 may be set in a range of 0.02 mm to 0.1 mm, taking insulation performance and an overall size into consideration.

According to the present embodiment, the aluminum plate 1 with the insulating layer 12 is used to manufacture the aluminum case. In the manufacturing process, and in a processing of the aluminum plate 1, the generation of the metal dust may be reduced, and the metal dust on the insulating layer 12 is convenient to clean, reducing the risk of short circuit inside a battery caused by the metal dust, and preventing the metal dust on the outer surface of the aluminum case from falling on other components, which may cause potential security hazard. In addition, because the inner surface of the aluminum case has the insulating layer 12, even when an insulating film covering a negative cell is cracked during use, the negative cell is still not in direct contact with the plate body 11 of the aluminum case to conduct electricity, thereby avoiding short circuit and improving the safety factor of the battery. When the inner surface of the aluminum case has the insulating layer, the insulating film is no longer needed to cover the negative cell, saving the subsequent production cost of the battery and simplifying the subsequent battery manufacturing process. In addition, the insulating layer provided on the inner surface may also prevent an electrolyte from corroding the inner surface of the aluminum case. By using an aluminum plate with an insulating layer 12, after the aluminum case is made, the outer surface of the aluminum case has the insulating layer 12, and the film is no longer needed to additionally cover the external of the battery after the aluminum case and cover plate are assembled into the battery, simplifying the subsequent assembly process of the battery and saving the cost of subsequent additional films covering on the battery.

Figure 3:
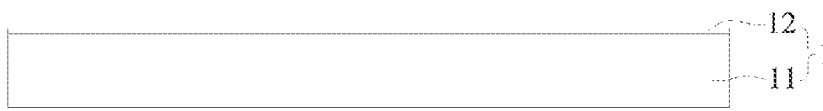
FIG. 3 is a schematic structural diagram of an aluminum plate provided by another embodiment.
Figure 4:
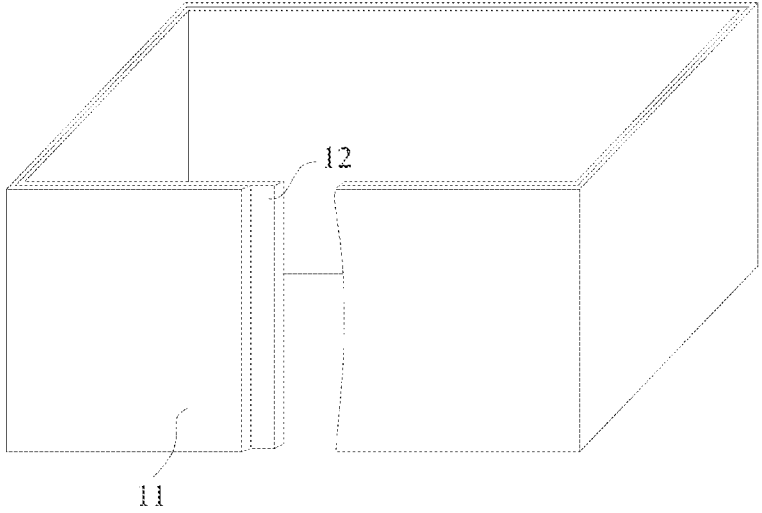
FIG. 4 is a schematic structural diagram of an aluminum case provided by another embodiment.

As shown in FIG. 4, the present embodiment provides an aluminum case with an insulating layer on an inner surface of the aluminum case. After the aluminum case is molded, the inner surface is provided with the insulating layer 12. The aluminum case is made of an aluminum plate 1 as shown in FIG. 3. The aluminum plate 1 includes a plate body 11, and an insulating layer 12 is attached to a surface of the plate body 11 corresponding to the inner surface of the aluminum case, so that the inner surface of the aluminum case after being molded has the insulating layer 12. In one embodiment, the aluminum case may be stamp-molded from the aluminum plate 1, for example, molded by stamp-stretching, which is convenient for manufacturing. A thickness of the insulating layer 12 may be set in a range of 0.02 mm to 0.1 mm, taking insulation performance and the overall size into consideration.

According to the present embodiment, the aluminum plate 1 with the insulating layer 12 is used to manufacture the aluminum case. In the manufacturing process, and in a processing of the surface where the insulating layer 12 is located, no metal dust is generated, which not only reduces the metal dust, but also is convenient for cleaning the metal dust on the inner surface of the aluminum case, reducing the risk of the short circuit inside a battery caused by the metal dust. In addition, because the inner surface of the aluminum case has the insulating layer 12, even when the insulating film covering a negative cell is cracked during use, the negative cell is still not in direct contact with the plate body 11 of the aluminum case to conduct electricity, thereby avoiding short circuit and improving the safety factor of the battery. When the inner surface of the aluminum case has the insulating layer, the insulating film is no longer needed to cover the negative cell, saving the subsequent production cost of the battery and simplifying the subsequent battery manufacturing process. In addition, the insulating layer arranged on the inner surface may also prevent the electrolyte from corroding the inner surface of the aluminum case.

Figure 5:
FIG. 5 is a schematic structural diagram of an aluminum plate provided by another embodiment.
Figure 6:
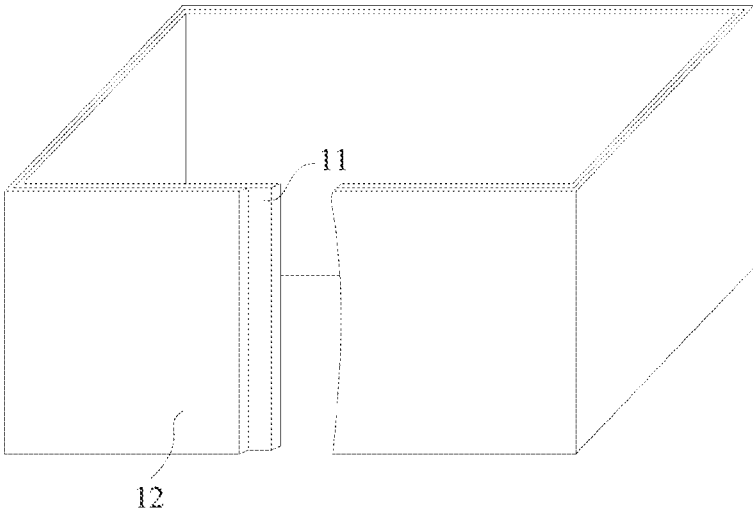
FIG. 6 is a schematic structural diagram of an aluminum case provided by another embodiment.

As shown in FIG. 6, the present embodiment provides an aluminum case with an insulating layer on an outer surface of the aluminum case. After the aluminum case is molded, the outer surface is provided with the insulating layer 12, without additional films. The aluminum case is made of an aluminum plate 1 as shown in FIG. 5. The aluminum plate 1 includes a plate body 11, and the insulating layer 12 is attached to a surface of the plate body 11 corresponding to the outer surface of the aluminum case, so that the outer surface of the aluminum case after being molded has the insulating layer 12. In one embodiment, the aluminum case may be stamp-molded from the aluminum plate 1, for example, molded by stamp-stretching, which is convenient for manufacturing. A thickness of the insulating layer 12 may be set in a range of 0.02 mm to 0.1 mm, taking the insulation performance and the overall size into consideration.

According to the present embodiment, the aluminum plate 1 with the insulating layer 12 is used to manufacture the aluminum case. In the processing of the surface where the insulating layer 12 is located, no metal dust is generated, which is convenient for cleaning the metal dust on the surface of the insulating layer 12, preventing the metal dust on the outer surface of the aluminum case from falling on other components, which may cause potential security hazard. By using the aluminum plate with the insulating layer 12, after the aluminum case is made, the outer surface of the aluminum case has the insulating layer 12, and the film is no longer needed to additionally cover the external of the battery after the aluminum case and cover plate are assembled into the battery, simplifying the subsequent assembly process of the battery and saving the cost of subsequent additional films covering on the battery.

In the present embodiment, the insulating layer 12 may be arranged as the plastic film, and may adopt a highly insulating plastic film to provide good insulation performance. In one embodiment, the plastic film may be made of materials such as polyethylene terephthalate (PET) or polypropylene (PP), and the plastic film may also be made of other materials with better insulation properties.

Figure 7:
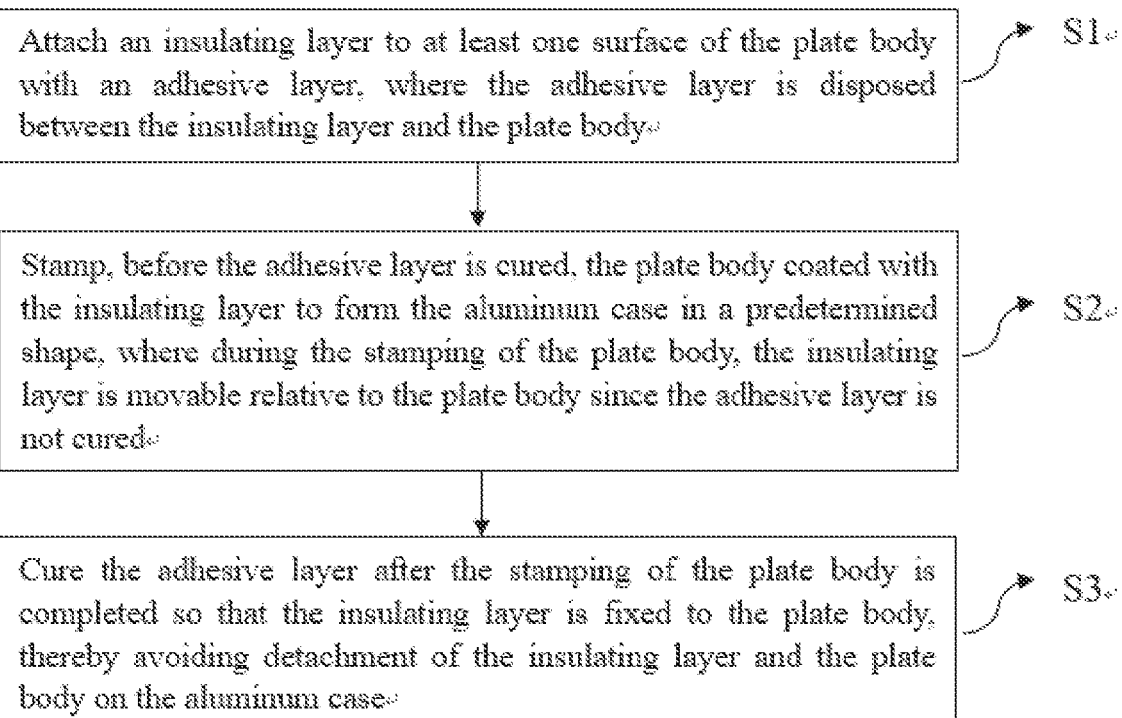
FIG. 7 is a flow chart of a method for manufacturing an aluminum case provided by another embodiment.

As shown in FIG. 7, the present embodiment provides a method for manufacturing an aluminum case of a battery. The battery comprises a cover plate, the cover plate is closed at an opening of the aluminum case to form an outer case of the battery, and the aluminum case comprises a plate body. The method includes steps described below.

In step S1, an insulating layer is attached to at least one surface of the plate body with an adhesive layer, where the adhesive layer is disposed between the insulating layer and the plate body.

In step S2, before the adhesive layer is cured, the plate body coated with the insulating layer is stamped to form the aluminum case in a predetermined shape, where during the stamping of the plate body, the insulating layer is movable relative to the plate body since the adhesive layer is not cured.

In step S3, after the stamping of the plate body is completed, the adhesive layer is cured so that the insulating layer is fixed to the plate body, thereby avoiding detachment of the insulating layer and the plate body on the aluminum case.

The insulating layer 12 may be attached to the surface of the plate body 11 by a plurality of manners, such as spraying, hot-pressing, or adhesive, as long as a relatively good attachment may be ensured. However, on the aluminum plate 1, the insulating layer 12 and the plate body 11 are not completely fixed. If the insulating layer 12 and the plate body 11 are completely fixed, when the aluminum plate 1 is stamp-stretched, due to different extensions of the insulating layer 12 and the plate body 11, the insulating layer 12 may be cracked and out of action. Therefore, in the present embodiment, the insulating layer 12 and the plate body 11 are not completely fixed, but have a certain amount of relative movement, so that when stamp-molded, the insulating layer 12 and the plate body 11 may be relatively moved to keep the insulating layer 12 intact, so as to prevent the insulating layer 12 from being cracked.

After the aluminum case is stretch-molded, the insulating layer 12 and the plate body 11 need to be cured. A plurality of curing manners may be used, such as heating or cooling an adhesive layer, so that the insulating layer 12 and the plate body 11 may be completely cured after the adhesive layer is cured, so as to avoid detachment of the insulating layer 12 and the plate body 11 on the aluminum case.

What is claimed is:

1. A method for manufacturing an aluminum case of a battery, wherein the battery comprises a cover plate, the cover plate is closed at an opening of the aluminum case to form an outer case of the battery, the aluminum case comprises a plate body, and the method comprises:

attaching an insulating layer to at least one surface of the plate body with an adhesive layer, wherein the plate body has an inner surface and an outer surface, and wherein the insulating layer covers at least one of the inner surface and the outer surface, and wherein the adhesive layer is located between the insulating layer and the plate body, stamping, before the adhesive layer is cured, the plate body attached with the insulating layer to form the aluminum case in a predetermined shape, wherein during the stamping of the plate body, the insulating layer is movable relative to the plate body since the adhesive layer is not cured;

curing the adhesive layer after the stamping of the plate body is completed so that the insulating layer is fixed to the plate body, thereby avoiding detachment of the insulating layer and the plate body on the aluminum case.

2. The method of claim 1, wherein an inner surface of the plate body is provided with the insulating layer.

3. The method of claim 1, wherein an outer surface of the plate body is provided with the insulating layer.

4. The method of claim 1, wherein an inner surface and an outer surface of the plate body are both provided with the insulating layer.

5. The method of claim 1, wherein the insulating layer is configured to be a plastic film.

6. The method of claim 5, wherein the plastic film is made from Polyethylene terephthalate (PET) or polypropylene (PP).

7. The method of claim 1, wherein the insulating layer is cured by heating or cooling the insulating layer.

8. The method of claim 1, wherein a thickness of the insulating layer is configured in a range of 0.02 mm to 0.1 mm.

* * * * *